United States Patent
Shih et al.

(10) Patent No.: US 8,161,277 B2
(45) Date of Patent: Apr. 17, 2012

(54) METHOD OF SAFE AND RECOVERABLE FIRMWARE UPDATE AND DEVICE USING THE SAME

(75) Inventors: Hsiang-Chueh Shih, Hsinchu (TW); Kuan-Liang Kuo, Hsinchu County (TW)

(73) Assignee: Novatek Microelectronics Corp., Hsinchu (TW)

( * ) Notice: Subject to any disclaimer, the term of this patent is extended or adjusted under 35 U.S.C. 154(b) by 438 days.

(21) Appl. No.: 12/468,068

(22) Filed: May 19, 2009

(65) Prior Publication Data

US 2010/0199078 A1 Aug. 5, 2010

(30) Foreign Application Priority Data

Feb. 4, 2009 (TW) ............................... 98103499 A (51) Int. Cl.
*G06F 1/24* (2006.01)
(52) U.S. Cl. ............................................... 713/2; 713/1
(58) Field of Classification Search ................... 713/1, 2
See application file for complete search history.

(56) References Cited

U.S. PATENT DOCUMENTS

| | | | |
|---|---|---|---|
| 5,960,445 A * | 9/1999 | Tamori et al. | 717/168 |
| 6,584,559 B1 * | 6/2003 | Huh et al. | 713/2 |
| 7,080,246 B2 * | 7/2006 | Rothman et al. | 713/2 |
| 2004/0111597 A1 * | 6/2004 | Rothman et al. | 713/1 |
| 2004/0193865 A1 * | 9/2004 | Nguyen et al. | 713/2 |
| 2005/0166010 A1 * | 7/2005 | Martin | 711/111 |

* cited by examiner

*Primary Examiner* — Kim Huynh
*Assistant Examiner* — Zahid Choudhury
(74) *Attorney, Agent, or Firm* — Jianq Chyun IP Office (57) ABSTRACT

A safe and recoverable firmware update method which for a remote embedded electronic device and the device thereof. The method includes reading an update status in a flash memory, and determining the update status. If the update status is "DEFAULT", a default firmware is executed. If the update status is not "DEFAULT", the update status is further determined if it is "UPDATED". If the update status is "UPDATED", a configuration area is set as "BOOTING" and a new firmware is executed. If the update status is not "UPDATED", the update status is determined if it is "RUN-NEW". If the update status is "RUNNEW", a new firmware and an update validation method are executed. If the update validation method gets an update completion validation message, the update status is set as "RUNNEW". If the update status is not "RUNNEW", a default firmware is executed.

30 Claims, 6 Drawing Sheets

METHOD OF SAFE AND RECOVERABLE FIRMWARE UPDATE AND DEVICE USING THE SAME

CROSS-REFERENCE TO RELATED APPLICATION

This application claims the priority benefit of Taiwan application serial no. 98103499, filed on Feb. 4, 2009. The entirety of the above-mentioned patent application is hereby incorporated by reference herein and made a part of specification.

BACKGROUND OF THE INVENTION

1. Field of the Invention

The present invention relates to a firmware update method, and more particularly, to a safe and recoverable firmware update method using in an embedded electronic device and the embedded electronic device thereof.

2. Description of Related Art

Currently, embedded electronic devices may be updated with new firmware through manually downloading the new firmware from the Internet and later installing on the embedded electronic devices. Conventional firmware update methods include determining if there is a new version of firmware on a server downloadable via the Internet, then downloading the new version of firmware, and installing the designated embedded electronic devices. Besides, the conventional firmware update methods may have new firmware stored on one special storage device of the embedded electronic devices, set a flag for determining if an update is necessary, and clear the flag after a successful update of the firmware. In addition, it may also be done by determining whether a user presses a special key combination on the embedded electronic device, and by executing a firmware update process via a universal serial bus (USB) connection. Nonetheless, the conventional firmware update methods mostly involve directly downloading the new version of firmware to replace old version of firmware on the memory of the embedded electronic device. Without an appropriate backup mechanism, the embedded electronic device may not operate normally after the firmware update process if there occurs an abnormal event during the firmware update process or the process of writing the new firmware into the memory such as a device crash, a power outage, or a software defect in the new version of firmware. Most of the embedded electronic devices (e.g., a digital camera of a surveillance system installed around the wall) may not tolerate such a firmware update failure. Once the firmware update failure occurs, the embedded electronic device may not be re-booting properly, and also may no longer be able to carry out a new firmware update. However, it is normal to experience many different abnormal events during a development cycle of the embedded electronic device; therefore, there is need of a mechanism for safely updating firmware.

In order to prevent the embedded electronic device from not operating normally after the firmware update process, there are corresponding methods able to be applied such as using two sections of memory area for storing old version of firmware and new version of firmware separately, and through a special flag and a checksum to determine if the firmware update process is correct. If the firmware update failure occurs, the user may be able to drive the old version of firmware to re-boot the embedded electronic device through pressing a key or a key combination. In addition, the firmware update process may enter a special working mode such that a watchdog program set previously inside the embedded electronic device may drive the old version of firmware or a default firmware to re-boot the embedded electronic device when a preset timer expires in response to the firmware update failure. However, the above-described firmware update methods either require additional electronic circuits or hardware for realization, yet not guaranteeing the embedded electronic device successfully re-boot each time after the firmware update process, or require updating firmware through a manual way or by other means after the firmware update failure. Therefore, what is required is a method to safely update firmware for the embedded electronic device with a recoverable mechanism.

SUMMARY OF THE INVENTION

Accordingly, the present invention provides a firmware update method using in a remote embedded electronic device for solving above-described problems.

The present invention further provides a firmware update method using in an embedded electronic device.

The present invention further provides a remote embedded electronic device using the above-described firmware update method.

In order to achieve the above-described or other purposes, according to an embodiment of the present invention, the present invention provides a firmware update method for an electronic device. The firmware update method includes executing a boot loader for an initialization configuration, reading an update status from a configuration area of a memory, and determining the update status. If the update status is determined as a "DEFAULT" status, a default firmware is executed. If the update status is not determined as a "DEFAULT" status, the method further determines if the update status is an "UPDATED" status. If the update status is determined as an "UPDATED" status, a new firmware is executed. If the update status is not determined as the "UPDATED" status, the method further determines if the update status is a "RUNNEW" status. If the update status is determined a "RUNNEW" status, the new firmware is executed, and also an update validation method is executed. If the update confirmation method receives an update validation completion message, the update status is set as the "RUNNEW" status. If the update status is not determined as the "RUNNEW" status, it means the previous update is failed, then the default firmware is executed, and the remote embedded electronic device is restored to an initial default mode.

According to an embodiment of the present invention, the present invention further provides a firmware update method of an embedded electronic device. The firmware update method of an embedded electronic device includes executing a boot loader for an initialization configuration, determining if an update status of a configuration area of a memory has entered an "UPDATED" status, and executing an update validation method. If the update status is determined as the "UPDATED", the update status is set as "BOOTING", and a new firmware is executed. If the update confirmation method receives an update validation completion message, the update status is set as a "RUNNEW" status, and until re-booting of the embedded electronic device, the new firmware is executed. On the contrary, if the update validation method does not receive the update validation completion message, the update status is kept as the "BOOTING" status, a default firmware is executed when the embedded electronic device is re-boot, and the embedded electronic device is restored to an initial default mode.

According to an embodiment of the present invention, the present invention further provides an embedded electronic device for executing the above-described firmware update method. The embedded electronic device includes a processor, a random access memory, a read only memory, and an input/output interface. Besides, the read only memory is separated to four areas, and the four areas of the read only memory are adapted for storing a boot loader, configuration parameters, a default firmware, and a new firmware. In addition, the input/output interface includes a network interface.

The present invention provides a safe and recoverable firmware update method by validating an update status of the embedded electronic device and confirming a successful firmware update such that the embedded electronic device selects the default firmware for re-booting when the firmware update fails, and keeps a capability of updating firmware again.

In order to make the features and advantages of the present invention comprehensible, preferred embodiments accompanied with figures are described in detail below.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Reference will now be made in detail to the present exemplary embodiments of the invention, examples of which are illustrated in the accompanying drawings. Wherever possible, the same reference numbers are used in the drawings and the description to refer to the same or like parts.

Figure 1:
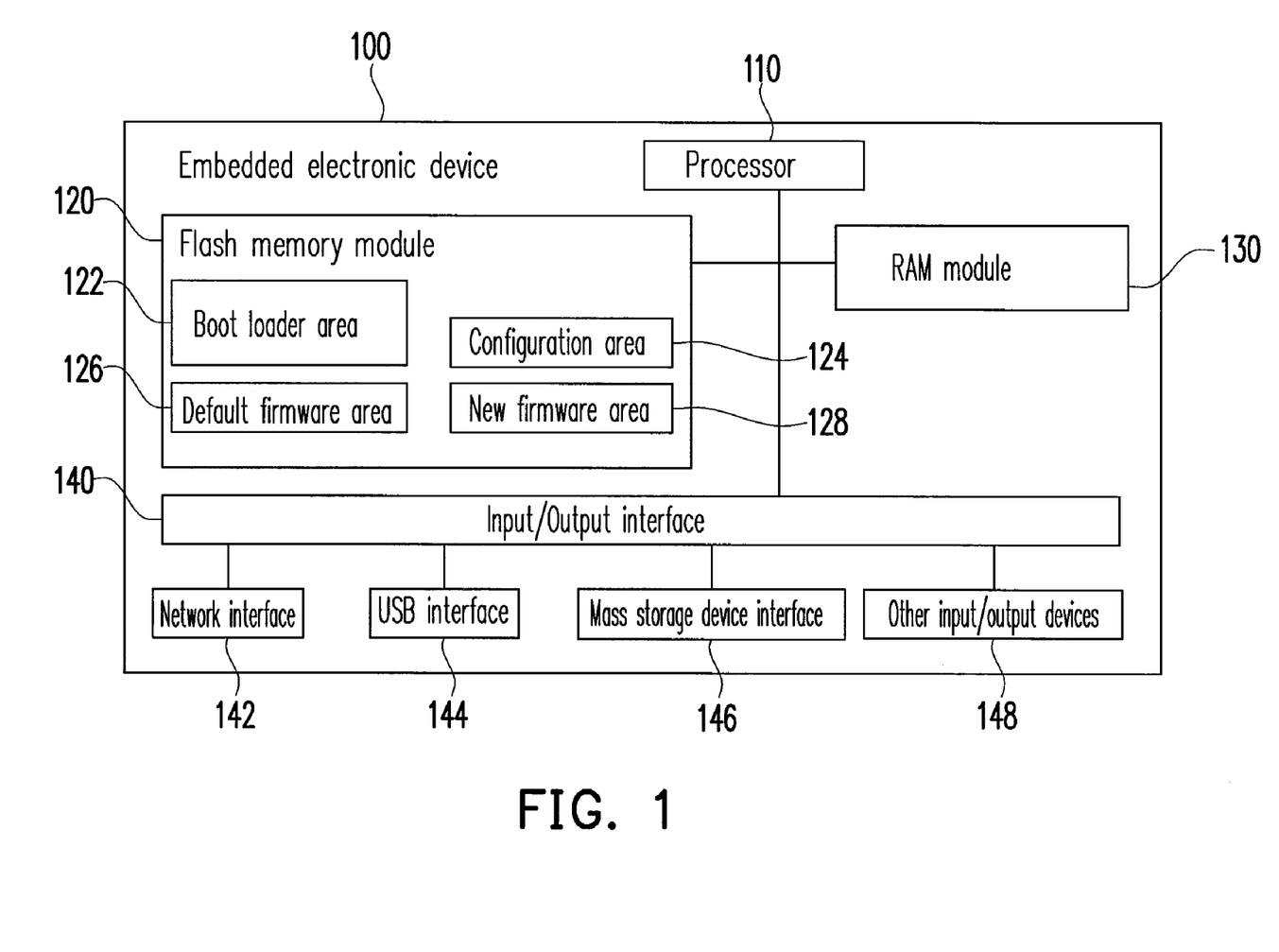
FIG. 1 is a block diagram of system architecture of an embedded electronic device according to one exemplary embodiment of the present invention.

FIG. 1 is a block diagram of system architecture of an embedded electronic device 100 according to one exemplary embodiment of the present invention. In this exemplary embodiment, the embedded electronic device 100 includes a processor 110, a flash memory module 120, a random access memory (RAM) module 130, and an input/output (I/O) interface 140. Besides, in this exemplary embodiment, the RAM module 130 of the embedded electronic device 100 may store program modules, the program modules are executed by the processor 110, executing one or more processes of medium programs. Furthermore, the RAM module 130 may be one or more memory devices, adapted for storing data and software programs. For example, the RAM module 130 may be one of a group consisting of a magnetic storage device, a flash memory storage device, or an optical storage device. In addition, the processor 110 may be a processor adapted for executing the program modules for one or more configurations.

Referring to FIG. 1, in this exemplary embodiment, the flash memory module 120 of the embedded electronic device 100 may be separated to four areas, and the four areas are a boot loader area 122, a configuration area 124, a default firmware area 126, and a new firmware area 128 respectively. Besides, the I/O interface 140 of the embedded electronic device 100 includes a network interface 142, a universal serial bus (USB) interface 144, a mass storage device interface 146, and other input/output devices interface 148.

In this exemplary embodiment, the boot loader 122 of the flash memory module 120 is configured for storing a boot loader program, and the boot loader program is used for executing an initialization of the embedded electronic device 100, and writing a main firmware module into the RAM module 130 for further execution.

In this exemplary embodiment of the present invention, the configuration area 124 is configured for storing configuration parameters. The configuration parameters include an update status of the firmware. The update status of the firmware may be categorized as four states such as a "DEFAULT" state, an "UPDATED" state, a "BOOTING" state, and a "RUNNEW" state.

In this exemplary embodiment, the default firmware area 126 of the flash memory module 120 is configured for storing a default firmware. The default firmware has capabilities of operating the embedded electronic device 100 normally and updating the firmware again.

In addition, in this exemplary embodiment, the new firmware area 128 of the flash memory module 120 is configured for storing a new firmware.

It is to be noted that, the above-described firmware may include an operating system, a file system, a firmware update program, a firmware update validation program, and other associated application programs.

Referring to FIG. 1, in this exemplary embodiment, the new firmware may be downloaded from a server (not shown) which contains the new firmware to the embedded electronic device 100 via the network interface 142. For example, the network interface 142 of the I/O interface 140 may be a local area network interface configured for connecting the embedded electronic device 100 and the server (not shown). Besides, the network interface 142 may connect the embedded electronic device 100 to Internet for further connection with another server which may also contain the new firmware. The above-described embodiments are exemplary and do not limit the present invention, and the network interface 142 of the embedded electronic device 100 of the present invention, for example, may also be a dial-up network interface, a wireless network interface, a metropolitan area network interface, a wide area interface or an optical fiber network interface.

Referring to FIG. 1, in this exemplary embodiment, the USB interface 144 of the I/O interface 140 is configured for connecting the embedded electronic device 100 to other electronic device for downloading the new firmware. For example, other electronic device may be a movable memory module which may be one or a plurality of memory devices configured for storing data, software programs, and/or software directives, and may also be one selected from a group consisting of RAM, a magnetic storage device, a flash memory storage device, or an optical storage device. In addition, for example, the other electronic device may be a portable or movable computer.

Referring to FIG. 1, similar to the USB interface 144, the mass storage device interface 146 of the I/O interface 140 is configured for connecting the embedded electronic device 100 to an external storage device for downloading the new firmware. For example, the external memory device may be a movable memory card. Furthermore, in another example, the external memory device may be a movable memory module which may be one or a plurality of memory devices configured for storing data, software programs, and/or software directives, and may also be one selected from a group consisting of RAM, a magnetic storage device, a flash memory storage device, or an optical storage device.

In addition, in this exemplary embodiment, the I/O interface 140 also includes the other input/output devices interface 148. For example, the input/output devices interface 148 may be an IEEE 1394 High Speed Serial Bus interface. In other embodiments, the input/output devices interface 148 may be other types of input/output interface.

Figure 2:
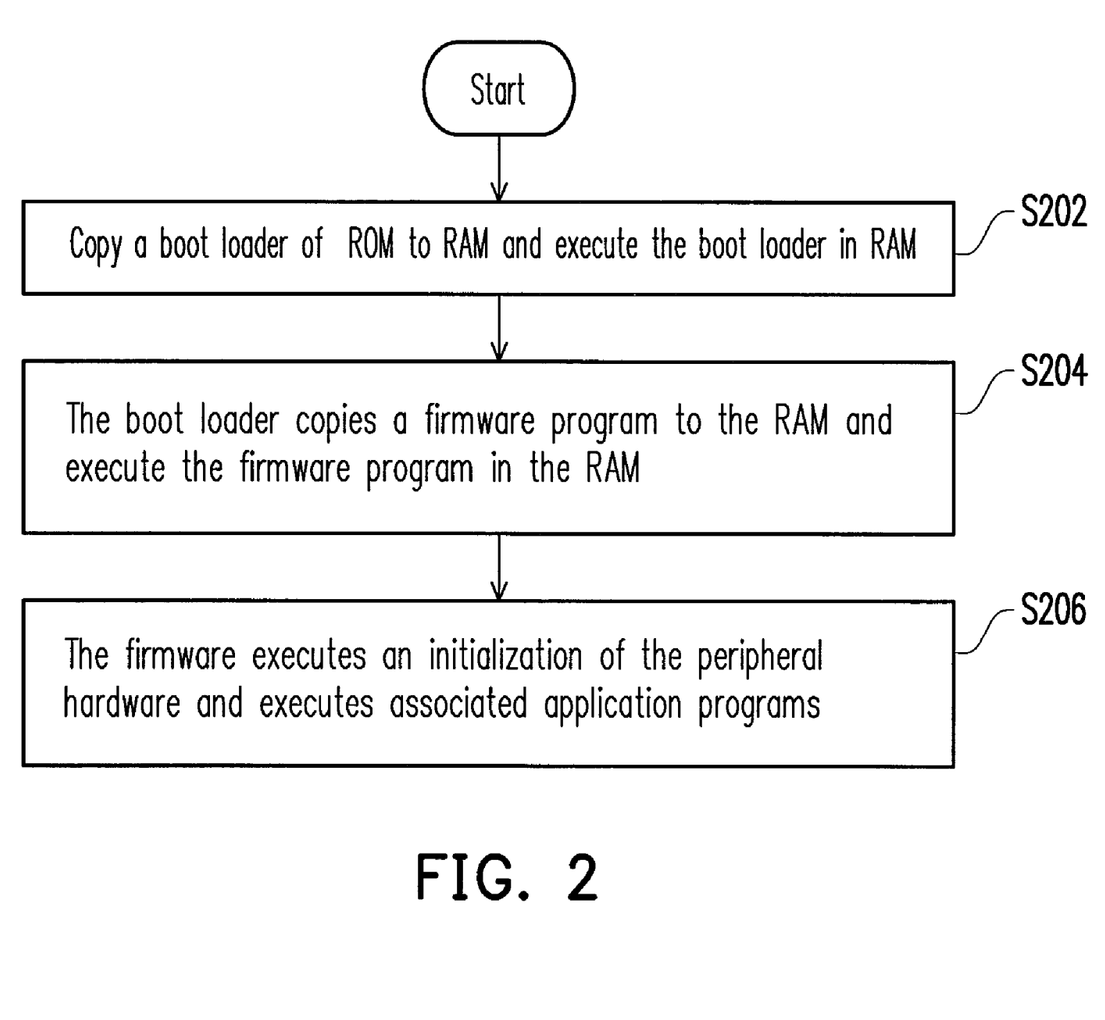
FIG. 2 is a flowchart of a power-on procedure of an embedded electronic device according to one exemplary embodiment of the present invention.

Referring to FIG. 2 and FIG. 1, FIG. 2 is a flowchart of a power-on procedure of the embedded electronic device 100 according to one exemplary embodiment of the present invention. First, at process block S202, the processor 110 copies the boot loader from the flash memory module 120 into the RAM module 130, and executes the boot loader.

Next, at process block S204, the boot loader copies a firmware into the RAM module 130 and executes the boot loader.

Furthermore, at process block S206, the firmware initializes the peripheral hardware of the embedded electronic device 100, and executes associated applications software of the firmware. If there is a need to update the firmware, it is required to execute a firmware update program. A firmware update method according to one exemplary embodiment of the present invention which the firmware update program may carry out will be described below along with FIG. 3 to FIG. 5.

Figure 3:
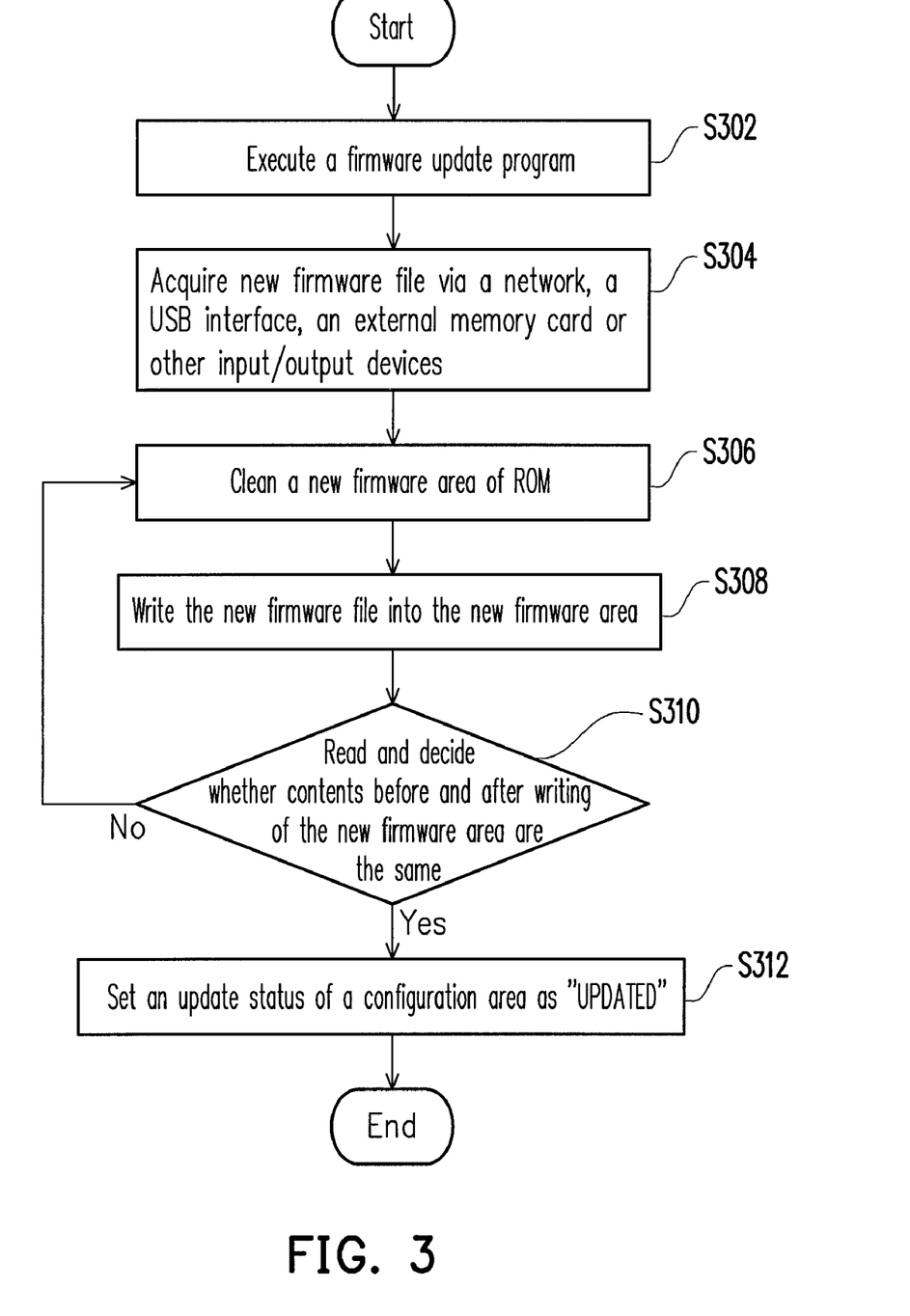
FIG. 3 is a flowchart of a firmware update method for one embedded electronic device according to one exemplary embodiment of the present invention.

Referring to FIG. 3 and FIG. 1, FIG. 3 is a flowchart of the firmware update method for the embedded electronic device 100 according to one exemplary embodiment of the present invention. First, at process block S302, the processor 110 executes the firmware update program of the flash memory module 120.

Next, at process block S304, the firmware update program acquires the new firmware. The method of acquiring the new firmware may includes establishing a connection path with a server containing the new firmware downloadable upon request via the network interface 142 of the I/O interface 140, and downloading the new firmware from the server. Besides, in other embodiments, the firmware update program may also acquire the new firmware through other ways. For example, the firmware update program may establish a connection path with another server containing the new firmware downloadable upon request via the USB interface 144 of the I/O interface 140, and download the new firmware. Furthermore, in another example, the firmware update program may connect with an external memory card containing the new firmware downloadable upon request via the mass storage device interface 146 of the I/O interface 140, and download the new firmware. In addition, for example, the firmware update program may connect to an optical memory module containing the new firmware downloadable upon request via an IEEE 1394 High Speed Serial Bus interface (not shown) of the I/O interface 140, and download the new firmware.

Furthermore, at process block S306, the firmware update program cleans the new firmware area 128 of the flash memory module 120.

Next, at process block S308, the firmware update program writes the new firmware downloaded successfully to the new firmware area 128 of the flash memory module 120.

Then, at process block S310, the firmware update program reads the new firmware in the new firmware area 128, and determines if the new firmware of the new firmware area 128 is the same as the new firmware previously acquired. If the new firmware of the new firmware area 128 is determined the same as the new firmware previously acquired, the process proceeds to process block S312. On the contrary, if the new firmware of the new firmware area 128 is determined different from the new firmware previously acquired, then the process returns to the process block S304.

Next, at process block S312, the firmware update program sets an update status of the configuration area 124 of the flash memory module 120 as an "UPDATED" status.

In this exemplary embodiment, in order to prevent the embedded electronic device 100 from being unable to re-boot after a firmware update failure, the present invention provides a method adapted for the boot loader to select the default firmware or the new firmware for booting when the embedded electronic device 100 re-boots after a firmware update process. This firmware selection method of the firmware update method according to one exemplary embodiment of the present invention will be described below along with FIG. 4.

Figure 4:
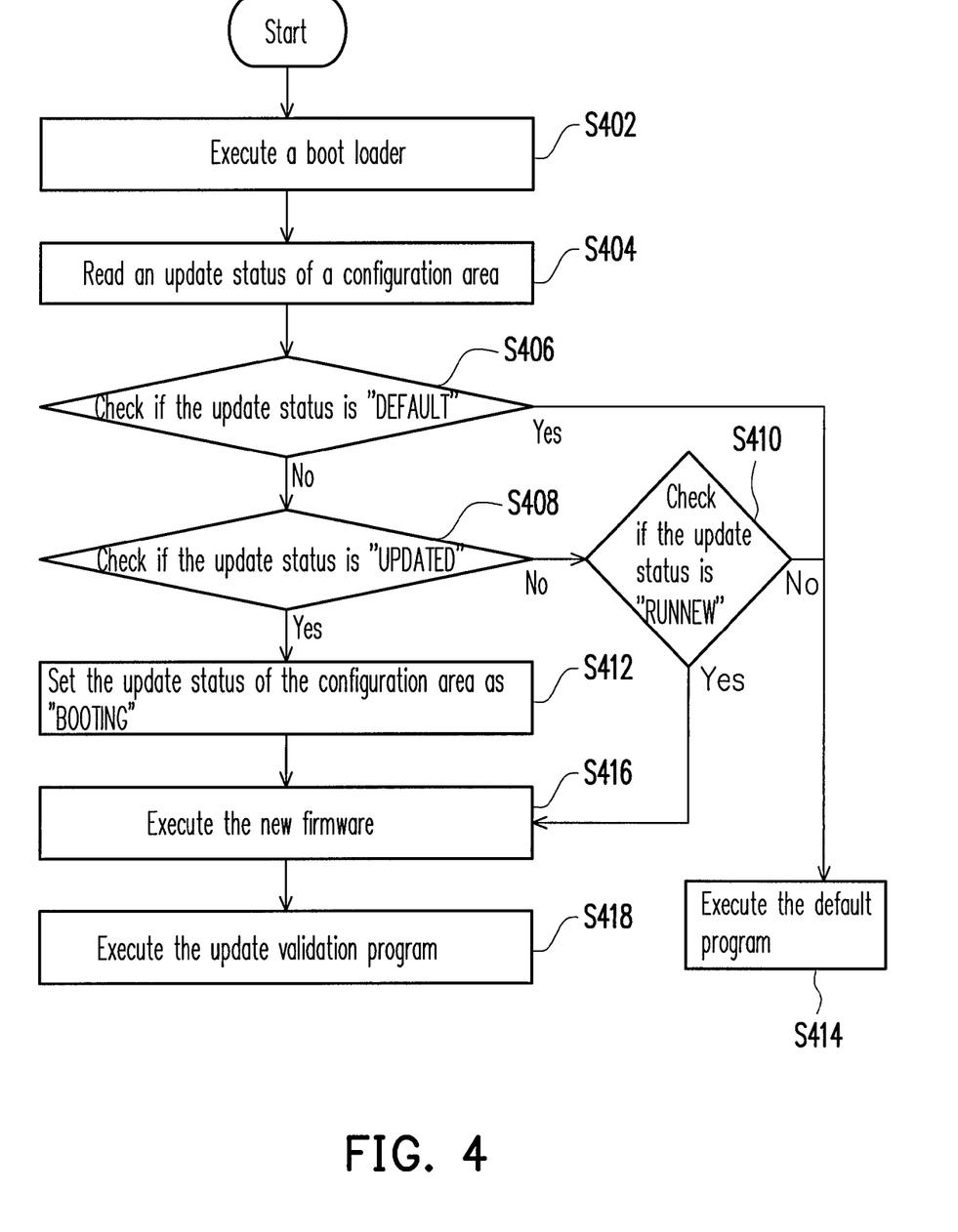
FIG. 4 is a flowchart of a firmware selection method of a firmware update method for an embedded electronic device according to one exemplary embodiment of the present invention.

Referring to FIG. 4 and FIG. 1, FIG. 4 is a flowchart of the firmware selection method of the firmware update method for the embedded electronic device 100 according to one exemplary embodiment of the present invention, and the firmware selection method is executed when the embedded electronic device 100 is booting. First, at process block S402, the processor 110 executes the boot loader.

Next, at process block S404, the boot loader reads the update status of the configuration area 124 of the flash memory module 120.

Furthermore, at process block S406, the boot loader determines if the update status is a "DEFAULT" status. If the update status is determined as the "DEFAULT" status, then proceed to process block S414, the default firmware is executed. On the contrary, if the update status is determined not as the "DEFAULT" status, then proceed to process block S408.

At the process block S408, the boot loader determines if the update status as "UPDATED" status. If the update status is determined as the "UPDATED" status, then proceed to process block S412. On the contrary, if the update status is determined not as the "UPDATED" status, then proceed to process block S410.

At the process block S410, the boot loader determines if the update status as "RUNNEW" status. If the update status is determined as the "RUNNEW" status, then proceed to process block S416. On the contrary, if the update status is determined not as the "RUNNEW" status, then proceed to the process block S414.

At the process block S412, the boot loader sets the update status of the configuration area 124 of the flash memory module 120 to a "BOOTING" status, and then proceeds to the process block S416.

At the process block S416, the processor 110 of the embedded electronic device 100 executes the default firmware.

Then, at the process block S416, the processor 110 of the embedded electronic device 100 executes the new firmware, and then proceeds to the process block S418.

Finally, at the process block S418, the processor 110 of the embedded electronic device 100 executes the firmware update validation program. The firmware update validation program will be described along with FIG. 5 below.

Figure 5:
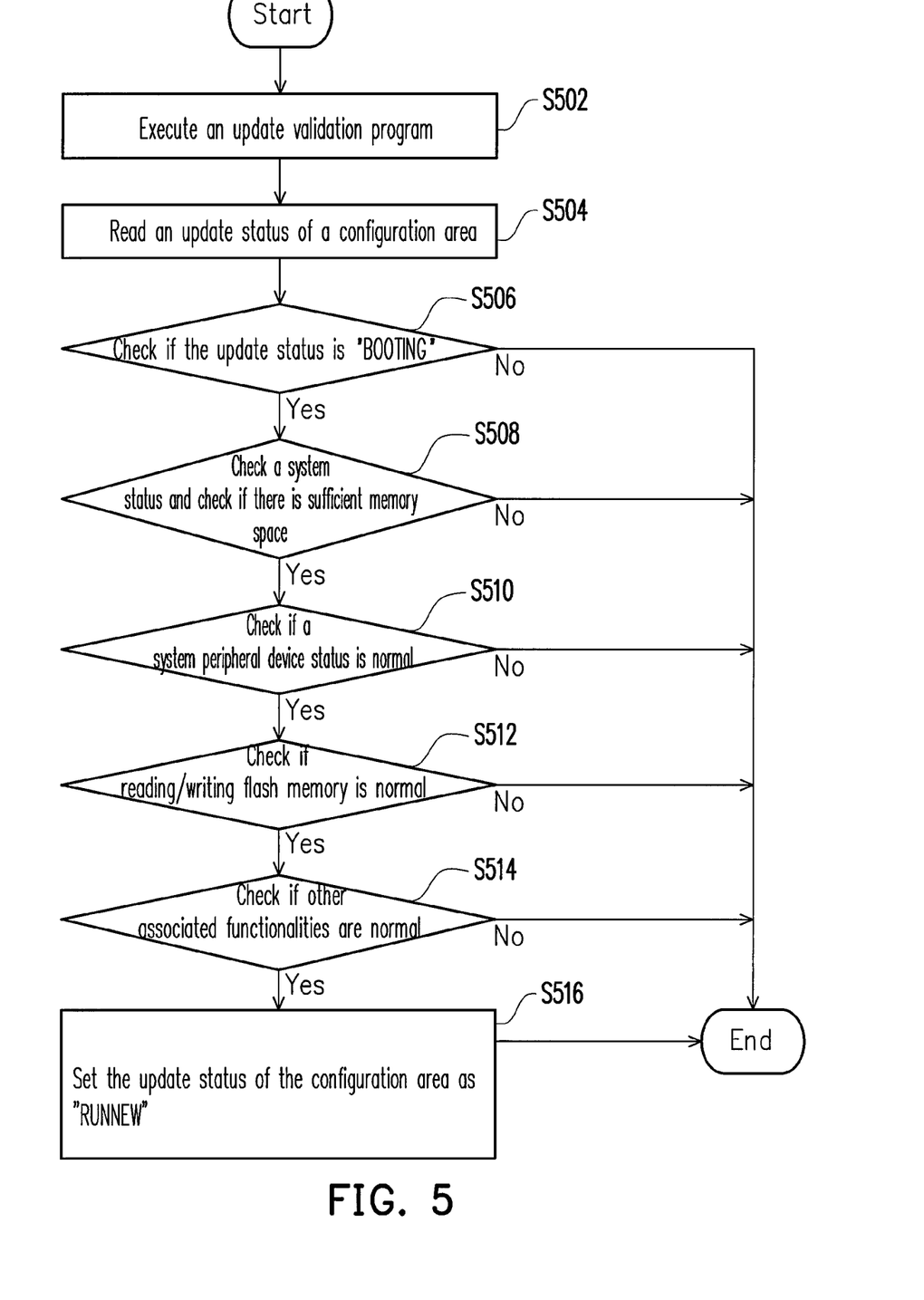
FIG. 5 is a flowchart of a detailed procedure for executing a firmware update validation program as illustrated in FIG. 4.

Referring to FIG. 5 and FIG. 1, FIG. 5 is a flowchart of a detailed procedure for executing the firmware update validation program as illustrated in FIG. 4. First, at process block S502, the processor 110 executes the firmware update validation program, and then proceeds to process block S504.

At the process block S504, the firmware update validation program reads the update status of the configuration area 124 of the flash memory module 120, and then proceeds to process block S506.

At the process block S506, the firmware update validation program determines if the update status is the "BOOTING" status. If the update status is determined as the "BOOTING" status, then proceed to block process S508. On the contrary, if the update status is determined not as the "BOOTING" status, then the firmware update validation program terminates this process.

At the process block S508, the firmware update validation program determines if there is sufficient RAM. If there is sufficient RAM, then proceed to process block S510. On the contrary, if there is no sufficient RAM, then the firmware update validation program terminates this process.

At the process block S510, the firmware update validation program determines if a system peripheral status is normal, wherein the system peripheral status may be one selected from a group consisting of a status of the network interface 142, a status of the USB interface 144, and a status of the mass storage device interface 146. If the system peripheral status is determined as normal, then proceed to process block S512. On the contrary, if the system peripheral status is determined not as normal, then the firmware update validation program terminates this process.

At the process block S512, the firmware update validation program determines if the flash memory module 120 is operating normally. To be more specific, the firmware update validation program checks if reading or writing the flash memory module 120 is normal. If the flash memory module 120 is determined as operating normally, then proceed to process block S514. On the contrary, if the flash memory module 120 is determined as not operating normally, then the firmware update validation program terminates this process.

At the process block S514, the firmware update validation program determines if other associated functionalities are operating normally. The other associated functionalities may be main functions of the embedded electronic device 100, for example, the other associated functionalities may be Transport Control Protocol (TCP), Internet Protocol (IP), User Datagram Protocol (UDP), streaming service functions, and/or streaming server connection associated functions. If the other associated functionalities are determined as operating normally, then proceed to process block S516. On the contrary, if the other associated functionalities are determined not as operating normally, then the firmware update validation program terminates this process.

Finally, at the process block S516, the firmware update validation program sets the update status of the configuration area 124 of the flash memory module 120 as the "RUNNEW" status.

Referring to FIG. 4 and FIG. 5, in this exemplary embodiment, the prevent invention provides the firmware selection method to select the default firmware of the new firmware, and the firmware selection method mainly determines a selection decision based on the update status of the configuration area 124. In this exemplary embodiment, a key procedure of the firmware selection method is that the boot loader temporarily sets the update status to the "BOOTING" status when the embedded electronic device 100 boots after the firmware update, and then execute the new firmware. Besides, the new firmware contains the firmware update validation program. Only after the firmware update validation program tests the memory size, the system peripheral device status, the status of the flash memory module 120, and other main functions of the embedded electronic device 100, and test result is determined as normal, the new firmware is thus determined as having the capability of updating firmware again. Then, the update status is set to the "RUNNEW" status. Thus, the embedded electronic device 100 uses the new firmware when reboots later. However, if there is any mistake during an execution process of the new firmware, which results in the firmware update validation program not being able to complete the process, then the update status is kept as the "BOOTING" status. Then, until next time of booting of the embedded electronic device 100, the boot loader executes the default firmware following the process of to the above-described firmware selection method illustrated in FIG. 4. The following uses one exemplary embodiment in FIG. 6 to describe a remote embedded electronic device and an associated operation or application environment using the firmware update method of the embedded electronic device 100 according to one exemplary embodiment of the present invention.

Figure 6:
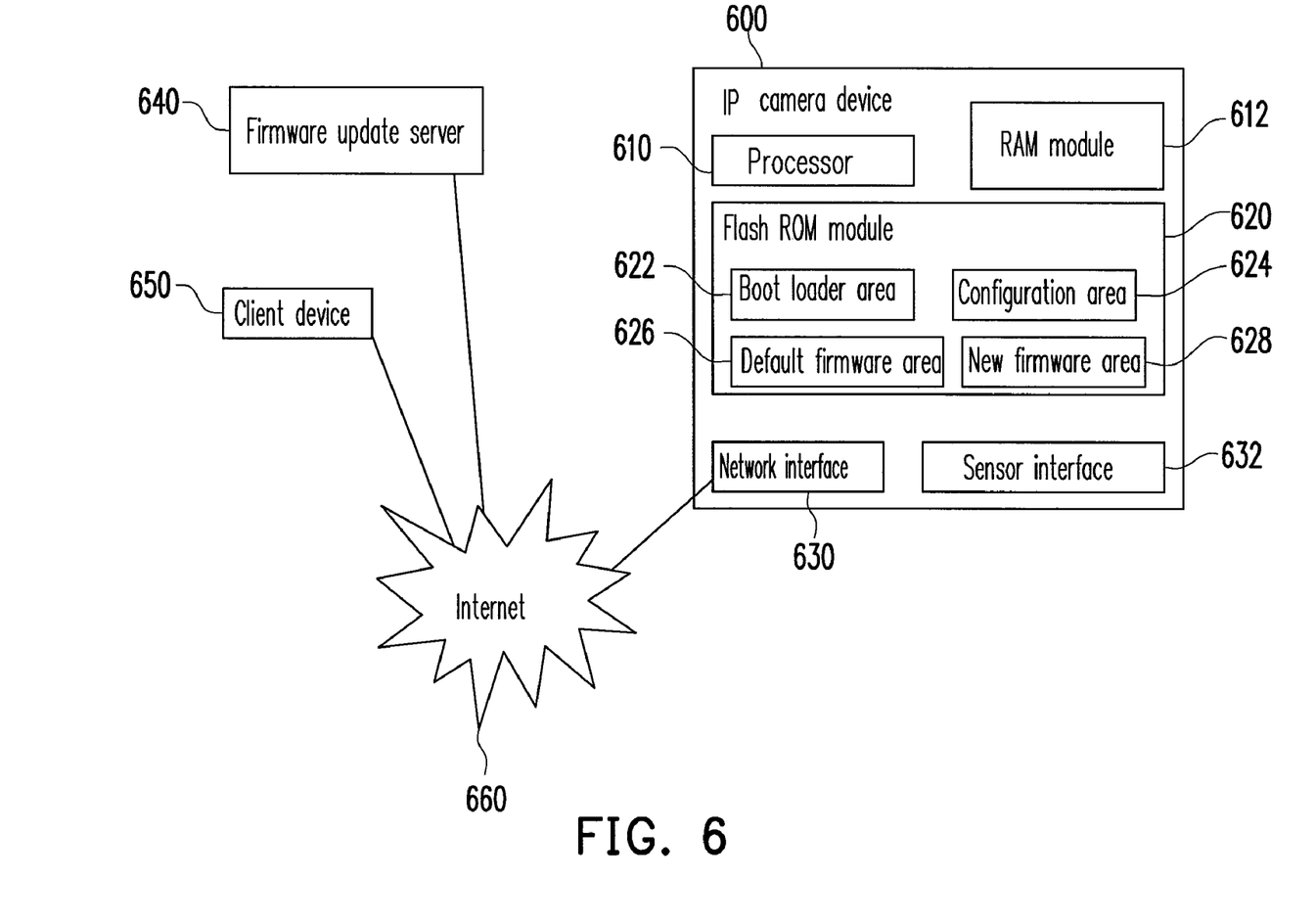
FIG. 6 is a schematic diagram of an IP camera operation environment according to one exemplary embodiment of the present invention.

Referring to FIG. 6, FIG. 6 is a schematic diagram of an IP camera device operation environment according to one exemplary embodiment of the present invention. An operation environment of the IP camera device 600 includes the IP camera device 600, a firmware download server 640, a client device 650, and the Internet 660. In addition, the IP camera device 600, the firmware download server 640, and the client device 650 are coupled together via the Internet 660.

Referring to FIG. 6, in this exemplary embodiment, the IP camera device 600 is capable of capturing video, compressing the video after capturing, and transmitting compressed video to the client device 650 via the Internet. In one exemplary embodiment, the client device 650, for example, may be a computer or a device capable of watching the video captured and transmitted by the IP camera device 600. Besides, in this exemplary embodiment, a user may watch or record the video captured by the IP camera device 600. Furthermore, in this exemplary embodiment, the user may download the new firmware of the IP camera device 600 from the firmware download server 640 manually, and then upload the new firmware to the IP camera device 600 for executing the firmware update program. When the IP camera device 600 completes the firmware update, the IP camera device 600 automatically re-boots according to the above-described processes of executing new firmware and the firmware update validation program illustrated in FIG. 4.

In this exemplary embodiment, in addition to associated testing procedures illustrated in FIG. 5, the IP camera device 600 may also test whether other associated functionalities such as a sensor interface 632 of the IP camera device 600, Internet connection, web page service, and application programs corresponding to the streaming server operate normally.

In this exemplary embodiment, if the above-described testing along with the associated testing procedures of FIG. 5 produce a normal testing result, then the IP camera device 600 may use the new firmware when reboots. On the contrary, if the above-described testing does not produce the normal test result, then the IP camera device 600 uses the default firmware when reboots.

In summary, the exemplary embodiments of the present invention provide a safe and recoverable firmware update method by validating an update status of the embedded electronic device and confirming a successful firmware update such that the embedded electronic device selects the default firmware for re-booting when there is the firmware update failure to achieve a safe and recoverable firmware update. The firmware update method, under a normal condition and without a special circuit hardware, ensures the embedded electronic device to be recovered when there is the firmware update failure after the firmware update process by executing the default firmware for rebooting itself after the firmware is updated. In addition, the firmware update method also guarantees the embedded electronic device capable of executing the firmware update again.

Though the present invention has been disclosed above by the preferred exemplary embodiments, they are not intended to limit the present invention. Anybody skilled in the art can make some modifications and variations without departing from the spirit and scope of the present invention. Therefore, the protecting range of the present invention falls in the appended claims.

What is claimed is:

1. A firmware update method for an electronic device, wherein the method comprises:
   executing a boot loader for an initialization configuration;
   reading an update status from a configuration area of a memory;
   determining the update status;
   executing a default firmware in response to the update status determined as a "DEFAULT" status; and
   executing a further determination of the update status in response to the update status determined not as the "DEFAULT" status wherein the further determination of the update status comprises:
   determining if the update status is an "UPDATED" status;
   setting the update status as a "BOOTING" status, and executing a new firmware in response to the update status determined as the "UPDATED" status; and
   executing a even further determination of the update status in response to the update status determined not as the "UPDATED" status, wherein the even further determination of the update status comprises:
   determining if the update status is a "RUNNEW" status;
   executing the new firmware and executing an update validation method after booting up in response to the update status determined as the "RUNNEW" status; and
   executing the default firmware in response to the update status determined not as the "RUNNEW" status,
   wherein the update validation method comprises:
      reading the update status from the configuration area of the memory;
      determining if the update status is the "UPDATED" status; and
      executing further procedures after determining if the update status is the "UPDATED" status, wherein the further procedures comprise:
         terminating the update validation method in response to the update status determined not as the "BOOTING" status;
         checking if conditions of re-downloading the new firmware are satisfied in response to the update status determined as the "BOOTING" status; and
         executing an even further procedure after determining if the conditions of re-downloading the new firmware are satisfied, wherein the even further procedure comprises:
            issuing an update validation completion message in response to the conditions of re-downloading the new firmware being satisfied.

2. The firmware update method as claimed in claim 1, wherein the conditions of re-downloading the new firmware comprise establishing a connection path between the electronic device and a server for acquiring a capability of re-downloading the new firmware.

3. The firmware update method as claimed in claim 2, wherein the procedure of determining if the conditions of re-downloading the new firmware are satisfied comprises executing tasks selected from a group consisting of checking system peripheral devices, checking the memory operation, and checking the memory size of the electronic device.

4. The firmware update method as claimed in claim 1, wherein the method further comprises establishing a connection path between the electronic device and a server via Internet, and downloading the new firmware from the server.

5. The firmware update method as claimed in claim 1, wherein the method further comprises establishing a connection path between the electronic device and a server via a dial-up connection, and downloading the new firmware from the server.

6. The firmware update method as claimed in claim 1, wherein the method further comprises establishing a connection path between the electronic device and a server via a local area network interface, and downloading the new firmware from the server.

7. The firmware update method as claimed in claim 1, wherein the method further comprises establishing a connection path between the electronic device and a server via a wireless network interface, and downloading the new firmware from the server.

8. The firmware update method as claimed in claim 1, wherein the memory is one of a plurality of read only memory (ROM) of the electronic device.

9. The firmware update method as claimed in claim 1, wherein the ROM is a flash read only memory.

10. A firmware update method for an electronic device, wherein the method comprises:
    executing a boot loader for an initialization configuration;
    determining if an update status of a configuration area of a memory has entered an "UPDATED" status, setting the update status as a "BOOTING" status and executing a new firmware in response to the update status determined as a "UPDATED" status; and
    executing an update validation method, setting the update status to a "RUNNEW" status, driving the electronic device to run the new firmware in response to the update validation method receiving an update validation completion message, and executing a default firmware in response to the update validation method not receiving the update validation completion message,
    wherein the update validation method comprises:
       determining if the update status is the "BOOTING" status, and terminating the update validation method in response to the update status determined not as the "BOOTING" status; and
       determining if conditions of re-downloading the new firmware are satisfied in response to the update status determined as the "BOOTING" status, and executing an update confirmation procedure, wherein the update confirmation procedure comprises:
          issuing the update validation completion message in response to the conditions of re-downloading the new firmware being satisfied, and setting the update status as the "RUNNER" status.

11. The firmware update method of the electronic device as claimed in claim 10, wherein the conditions of re-downloading the new firmware are adapted for establishing a connection path between the electronic device and a server for acquiring a capability of re-downloading the new firmware.

12. The firmware update method of the electronic device as claimed in claim 10, wherein the procedure of determining if conditions of re-downloading the new firmware are satisfied comprises executing tasks selected from a group consisting of checking system peripheral devices, checking the memory operation, and checking the memory size of the electronic device.

13. The firmware update method of the electronic device as claimed in claim 10, wherein the method further comprises establishing a connection path between the electronic device and a server via Internet, and downloading the new firmware from the server.

14. The firmware update method of the electronic device as claimed in claim 10, wherein the method further comprises downloading the new firmware from the server via a universal serial bus interface.

15. The firmware update method of the electronic device as claimed in claim 10, wherein the method further comprises downloading the new firmware from the server via a storage device interface.

16. The firmware update method of the electronic device as claimed in claim 10, wherein the method further comprises establishing a connection path between the electronic device and the server via a local area network interface, and downloading the new firmware from the server.

17. The firmware update method of the electronic device as claimed in claim 10, wherein the method further comprises establishing a connection path between the electronic device and the server via a wireless local area network interface, and downloading the new firmware from the server.

18. An electronic device for executing the firmware update method as claimed in claim 11 comprising:
a processor;
a random access memory (RAM);
a flash memory, the flash memory comprising four areas, wherein the four areas comprising:
a first area configured for storing a boot loader;
a second area configured for storing configuration parameters;
a third area configured for storing a default firmware; and
a fourth area configured for storing a new firmware; and
an input/output interface, wherein the input/output interface comprises a network interface;
wherein the electronic device executes the firmware update method as in claim 10.

19. The electronic device as claimed in claim 18, wherein the boot loader is adapted to configure an initialization of the electronic device, and further adapted to program the electronic device to:
determine if an update status of the second area of the memory of the electronic device has entered an "UPDATED" status;
set the updated status as a "BOOTING" status, and execute a new firmware in response to the update status has entered the "UPDATED" status; and
execute an update validation method, and further execute the following procedures:
set the update status as a "RUNNEW" status and execute the new firmware in response to the update validation method receiving an update validation completion message; and
execute the new firmware in response to the update validation method receiving the update validation completion message.

20. The electronic device as claimed in claim 18, wherein the update validation method specially programs the electronic device to:
determine the updated status has entered the "UPDATED" status; and
terminate the update validation method in response to the update status having not entered the "UPDATED" status; and
check conditions of re-downloading the new firmware are satisfied in response to the update status having entered the "UPDATED" status; and
issue the update validation completion message in response to the conditions of re-downloading the new firmware are satisfied.

21. The electronic device as claimed in claim 20, wherein the conditions of re-downloading the new firmware are used for establishing a connection path between the electronic device and a server for acquiring a capability of re-downloading the new firmware.

22. The electronic device as claimed in claim 20, wherein the procedure of determining if conditions of re-downloading the new firmware are satisfied comprises executing tasks selected from a group consisting of checking system peripheral devices, checking the memory operation, and checking the memory size of the electronic device.

23. The electronic device as claimed in claim 18, wherein the input/output interface further comprises:
a universal serial bus interface; and
an external mass storage device interface.

24. The electronic device as claimed in claim 20, wherein the conditions of re-downloading the new firmware further comprises establishing a connection path between the electronic device and a server via an Internet, and acquiring the capability of re-downloading the new firmware.

25. The electronic device as claimed in claim 20, wherein the conditions of re-downloading the new firmware further comprises establishing a connection path between the electronic device and a server via a dial-up network, and acquiring the capability of re-downloading the new firmware.

26. The electronic device as claimed in claim 20, wherein the conditions of re-downloading the new firmware further comprises establishing a connection path between the electronic device and a server via a local area network, and acquiring the capability of re-downloading the new firmware.

27. The electronic device as claimed in claim 20, wherein the conditions of re-downloading the new firmware further comprises establishing a connection path between the electronic device and a server via a wireless network, and acquiring the capability of re-downloading the new firmware.

28. The electronic device as claimed in claim 20, wherein the conditions of re-downloading the new firmware further comprises establishing a connection path between the electronic device and a server via a metropolitan area network, and acquiring the capability of re-downloading the new firmware.

29. The electronic device as claimed in claim 20, wherein the conditions of re-downloading the new firmware further comprises establishing a connection path between the electronic device and a server via a wide area network, and acquiring the capability of re-downloading the new firmware.

30. The electronic device as claimed in claim 20, wherein the conditions of re-downloading the new firmware further comprises establishing a connection path between the electronic device and a server via an optical fiber network, and acquiring the capability of re-downloading the new firmware.

* * * * *